United States Patent [19]

Shelstad

[11] Patent Number: 5,182,008
[45] Date of Patent: Jan. 26, 1993

[54] FILTRATION ASSEMBLY

[76] Inventor: Richard J. Shelstad, 37352 S. Black Foot Dr., Tucson, Ariz. 85737

[21] Appl. No.: 690,599

[22] Filed: Apr. 24, 1991

[51] Int. Cl.$^5$ ............................................. B01D 21/30
[52] U.S. Cl. .................... 210/139; 210/138; 210/143; 210/360.1; 210/368; 210/369; 210/374; 210/380.1; 210/403; 210/404; 210/456; 209/270; 209/285; 209/286; 494/36; 494/44
[58] Field of Search ............ 210/138, 139, 143, 360.1, 210/380.1, 403, 512.1, 404, 456, 369, 374, 368; 209/270, 285, 286; 494/36, 44

[56] References Cited

U.S. PATENT DOCUMENTS

| | | | |
|---|---|---|---|
| 4,186,096 | 1/1980 | Areaux | 494/36 |
| 4,352,451 | 10/1982 | Journet | 494/36 |
| 4,869,823 | 9/1989 | Otani et al. | 210/403 |
| 4,961,722 | 10/1990 | Taylor et al. | 210/369 |
| 5,078,903 | 1/1992 | Burgess | 210/143 |

Primary Examiner—Robert A. Dawson
Assistant Examiner—David Reifsnyder
Attorney, Agent, or Firm—Michael, Best & Friedrich

[57] ABSTRACT

A filtration apparatus including a rotatable drum and a filter member defining at least a part of the side wall of the drum. A liquid containing solid particles, such as used wash water from a vehicle washing facility, is introduced into the drum by a sump pump or the like and a motor including an electrically-operated brake rotates the drum at a sufficient speed to force a liquid filtrate or filtered water outwardly through the filter member and cause a layer of relatively dry solids to collect on the inner surface of the filter member. Operation of the drum motor is terminated at the same time or shortly after operation of the sump pump is terminated and the brake is energized at the same time. While the drum is being braked to a complete stop, a pressurized fluid, such as filtered water forced through the filter member, is sprayed onto the outer and inner surfaces of the filter member to dislodge the solid particles collected on the inner surface of the filter member and these solid particles are discharged from the bottom of the drum.

15 Claims, 1 Drawing Sheet

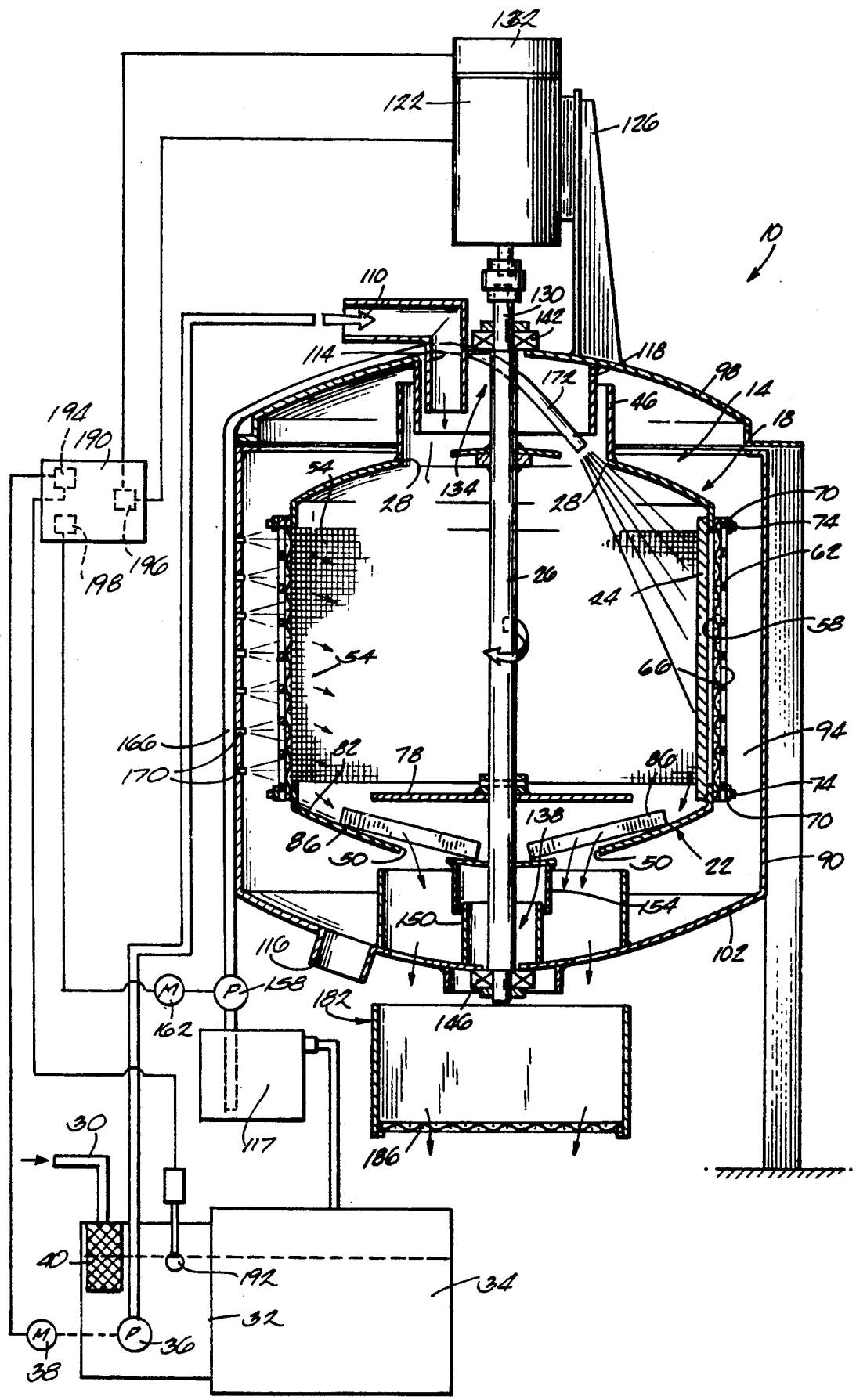

5,182,008

FILTRATION ASSEMBLY

BACKGROUND OF THE INVENTION

This invention relates to filtration assemblies and, more particularly, to filtration assemblies for removing small solid particles from a wastewater or wastewater sludge.

Vehicle washing facilities typically include a system for collecting and disposing dirty wash water. These systems usually include some kind of reservoir, such as sump, pit or holding tank, in which the wash water is collected and solid particles allowed to settle out.

Partially clarified water withdrawn from the reservoir is either re-used, after filtration to remove small solid particles which can clog spray nozzles, or disposed as a wastewater. The sludge collected in the bottom of the reservoir must be periodically removed. Because of its relatively high water content, some governmental regulations prohibit this sludge from being disposed in landfills, even though the solids themselves would be acceptable for such disposal. Consequently, the sludge requires special handling.

SUMMARY OF THE INVENTION

An object of the invention is to provide a simple filtration apparatus for effectively removing small solid particles from a liquid such as wastewater.

Another object of the invention is to provide such a filtration apparatus capable of producing a clarified water which can be disposed into a sewer and relatively dry solids can be disposed into a landfill.

Another object of the invention is to provide a method for effectively removing small solid particles from a liquid such as wastewater.

Other objects, aspects and advantages of the invention will become apparent to those skilled in the art upon reviewing the following detailed description, drawings and claims.

The invention provides a filtration apparatus for removing solid particles from a liquid and collecting a relatively low moisture solid residue including a drum supported for rotation about an axis and a filter member which defines at least a portion of the sidewall of the drum. A liquid containing solid particles from a reservoir or the like is introduced into the drum by a transfer means, such as a pump, the operation of which is controlled by a first control system. The drum is rotated by a drive means at a sufficient speed to generate centrifugal forces for forcing a liquid filtrate through the filter member and causing a relatively dry layer of solid particles to collect on the inner surface of the filter member. Operation of the drum drive means is controlled by a second control system which terminates operation of the drum drive means at a predetermined time after operation of the transfer means has been terminated. The solid particles collected on the inner surface of the filter member are dislodged by a pressurized fluid sprayed onto the outer surface, and preferably also onto the inner surface, of the filter member. Operation of the spray is controlled by a third control system which commences operation at a predetermined time after termination of operation of the transfer means and terminates spraying at a predetermined time thereafter, preferably at a time generally corresponding to the time rotation of the drum has stopped.

BRIEF DESCRIPTION OF THE FIGURE

The sole figure is a sectional and partially schematic view of a filtration assembly embodying the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

While the filtration assembly of the invention can be used in various applications to remove small solid particles from a liquid, it is particularly adapted for use in removing solids from a wastewater collected in a sump or the like in a vehicle washing facility and will be described in connection with that application.

The drawing illustrates a filtration assembly 10 including a rotatable drum 14 having a top portion 18 and a bottom portion 22 mounted on a shaft 26 for rotation of the drum 14 about a generally vertical axis. The top and bottom portions 18 and 22 are connected together by a plurality of circumferentially-spaced rods or bars 24 (one shown). The top portion 18 has a plurality of circumferentially-spaced, inlet openings 28 through which a dirty wash water from a car washing facility is introduced into the drum 14 by a suitable transfer means. In the specific embodiment illustrated, dirty wash water flowing through a conduit 30 connected to the wash bay collector drain of a car washing facility, enters a tank 32 located in a sump pit 34. Water collecting in the tank 32 is introduced into the drum 14 by a pump 36 located near the bottom of the tank 32 and driven by an electrical motor 38. Water entering the tank 32 passes through a trash basket 40 which removes and collects debris which could clog the pump 36. The pump 36 preferably is a sump or sewerage type pump with an open impeller designed to handle solids up to 1½ inch diameter. An annular collar 46 mounted on the top portion 18 of the drum 14 and surrounding the inlet openings 28 serves as a splash guard.

The bottom portion 22 of the drum 14 has a plurality of circumferentially-spaced, outlet openings 50 through which solids collected inside the drum during a filtration cycle described below are discharged.

A filter member, such as a metal screen 54, extends between and around the periphery of the top portion 18 and the bottom portion 22 of the drum and the inner surface 58 effectively forms the sidewall of the drum 14. The screen 54, which has a mesh size suitable for removing relatively small particles (e.g., 10 microns) is supported against a perforated support member 62 which surrounds the outer surface 66 of the screen. The opposite ends of both the screen 54 and the support member 62 are removably mounted on the top and bottom portions 18 and 22 of the drum 14 by bands 70 made of steel or other suitable material and a plurality of nuts 74 threaded onto circumferentially-spaced, outwardly extending bolts on the drum. Thus, the screen 54 can be conveniently removed for replacement by unthreading the nuts 74 from the bolts on the drum 14.

Mounted on the shaft 26 inside the drum 14 and near the bottom portion 22 is a circular baffle plate 78 which extends radially outwardly beyond the outlet openings 50. Any water entering through the inlet openings 28 and flowing directly toward the outlet openings 50 contacts the baffle plate 78 and is directed outwardly toward the screen 54, instead of flowing out through the outlet openings 50. In the preferred construction illustrated, the interior wall 82 of the bottom portion 22 is tapered downwardly toward the shaft 26. A plurality of radially-extending, circumferentially-spaced ribs 86 on the interior wall 82 of the bottom portion 22 promote the flow of liquid and solids outwardly toward the screen 54 while the drum is rotating and thereby further minimizes the amount of water or sludge discharged through the outlet openings 50.

A generally cylindrical shell 90 surrounding and spaced radially outwardly from the drum 14 defines a chamber 94 for collecting liquid filtrate or clarified water passing through the screen 54 during the rotation of the drum 14. The shell 90 has a top portion 98 and a bottom portion 102. Wash water from the tank 32 is introduced into the drum 14 through an inlet conduit 110 which extends into an opening 114 in the top portion 98 of the shell 90. The filtered water passing through the screen 54 is collected in the chamber 94 and drains therefrom through an outlet opening 116 and into an open intermediate reservoir 117. The filtered water overflows from the intermediate reservoir 117 into the sump pit 34. Mounted on and depending from the top portion 98 of the shell 90 is an annular shield 118 which telescopes inside the drum collar 46 and serves as a splash guard for water entering the drum 14.

The drum 14 is rotated by an electrical gear motor 122 or other suitable power source which is supported on the shell 90 by a motor bracket 126 and which is operably connected to the shaft 26 by a coupling 130. The motor 122 rotates the drum 14 at a speed sufficient to create centrifugal forces sufficient to force the liquid in the sludge outwardly through the screen 54 and cause a relatively dry layer of solid particles in the sludge to collect on the inner surface 58 of the screen. As a guide, this speed is in the order of 345 r.p.m. The motor 122 has a electrically-operated brake 132 for stopping rotation of the shaft 126 within a relative short time.

The shaft 26 has top and bottom ends 134 and 138 which are journaled in bearings 142 and 146, respectively. An annular splash guard 150 mounted on the bottom portion 102 of the shell 90 and surrounding the bottom end 138 of the shaft and a larger, annular splash guard 154 mounted on the bottom portion 22 of the drum 14 and telescoping over the smaller splash guard 150 protect the bearing 146 from water and solids discharged through the outlet openings 50.

Solid particles collected on the inner surface 58 of the screen 54 are periodically removed by spraying a pressurized fluid, such filtered water, against the outer surface 66, and preferably also against the inner surface 58, of the screen 54. In the specific construction illustrated, filtered water is pumped from the intermediate reservoir 117 by a pump 158 driven by an electrical motor 162 and introduced into a spray manifold 166 including a plurality of vertically spaced spray nozzles 170 located outside the shell 90. The spray nozzles 170 direct a water spray through openings in the shell 90 and against the outer surface 66 of the screen 54 under sufficient force to dislodge or loosen the solid particles collected on the inner surface 58 of the screen 54. In some cases, this force is not sufficient to completely remove the solid particles. To obtain a more complete removal of solids, the spray manifold 166 preferably includes a single spray nozzle 172 located inside the opening defined by the collar 46 or top of the drum 14. The spray nozzle 172 directs a water spray through the openings 28 in the top of the drum 14 and towards the inner surface 58 of the screen 54 to flush off solid particles loosened by water from the spray nozzles 170.

A receptacle 182 or other collecting means positioned beneath the outlet openings 50 in the bottom portion 22 of the drum 14 receives the solid particles dislodged from the screen 54. Solids falling through the outlet openings 50 are collected on a screen 186 in the bottom of the receptacle 182. Excess water drains through the screen 186 and into a drain (not shown) below the screen 186. The final collected solid particles are sufficiently dry for disposal in a landfill.

Operation of the sump pump 36 is controlled by a control system which energizes and de-energizes the sump pump motor 38. In the specific construction illustrated, the control system includes an electrical circuit 190 connected to a suitable power source (not shown) and interconnecting a float switch 192, disposed in the tank 32, a timer 194 and the sump pump motor 38. The timer 194 starts (energizes) and stops (de-energizes) the sump pump motor 38 at predetermined time intervals. The sump pump "on" cycle usually is in the order of 30-60 seconds. The float switch 192 is wired to prevent the timer 194 from starting the sump pump motor 38 in the event water in the tank 32 has dropped below a predetermined low level. The float switch 192 can be wired to start the sump pump motor 38 when the water in the tank 32 reaches a predetermined maximum level.

Rotation of the drum 14 is controlled by a control system which energizes and de-energizes the drum motor 122. In the specific construction illustrated, the electrical circuit 190 includes a timer 196 arranged to energize and de-energize the drum motor 122. The timer 196 starts (energizes) the drum motor 122 prior to or about the same time as the sump pump motor 38 is energized, so that the drum 14 is rotating at full speed by the time water from the tank 32 is introduced into the drum 14. The timer 194 de-energizes the drum motor 122, preferably about 20 to 30 seconds after the sump pump motor 42 is de-energized so that the drum 14 continues to rotate at full speed until there is no water remaining inside the drum 14, and at the same time energizes the drum motor brake 132 to stop drum rotation.

Operation of the spray nozzles 170 is controlled by a control system which energizes and de-energizes the spray pump motor 162. In the specific construction illustrated, the electrical circuit 190 includes a timer 198 interconnected with and arranged to energize and de-energize the spray pump motor 162. The timer 198 energizes the spray pump motor 162 at the same time as the drum motor 122 is de-energized and the drum motor brake 132 is energized and then de-energizes the spray pump motor 162 at a predetermined time thereafter. This time is usually about 15-20 seconds.

The spray from the spray nozzles 170 and 172 does not effectively remove the solid particles from the screen 54 until the drum 14 slows down to a relatively low r.p.m. The drum motor brake 132 reduces the time for the drum 14 to slow to that speed and thereby reduces the spray cycle. Spraying can continue for short time after the drum 14 has been braked to a full stop, so long as the amount of water introduced into the drum is not excessive.

In the wash bay of a vehicle washing facility, wash water containing detergent, wax, oils, dirt, sand, gravel, etc., typically drains into a sump pit where it is allowed to stand for a period of time sufficient to allow the heavier particles to settle out and form a sludge. This sludge, which must be periodically removed to prevent an excessive buildup, has a high moisture content. Consequently, it cannot be disposed in landfills and requires special handling for disposal. The filter assembly of the invention can be operated to prevent the buildup of such a sludge. This can be accomplished by performing the filtration cycle at close enough intervals to prevent unfiltered water from flowing directly from the tank 32 into the sump pit 34. With such an operation only water which as passed through the filter assembly reaches the sump pit 34.

Various features of the invention are set forth in the following claims.

I claim:

1. A filtration apparatus for removing solid particles from a liquid and collecting a low moisture solid residue comprising
    a drum supported for rotation about an axis and including an interior, a top portion and a bottom portion and a filter member defining at least part of a side wall extending between said top portion and said bottom portion and having inner and outer surfaces;
    transfer means for introducing a liquid containing solid particles into the interior of said drum;
    first control means operable to commence and terminate operation of said transfer means and thereby respectively commence and terminate introduction of said liquid into said drum, said first control means including means for commencing operation of said transfer means at predetermined time intervals and terminating operation of said transfer means in response to expiration of a predetermined time period thereafter;
    drive means for rotating said drum about said axis at a sufficient speed to generate centrifugal forces for forcing said liquid radially outwardly toward said filter member and cause a flow of liquid filtrate through said filter member and a relatively dry layer of solid particles to collect on the inner surface of said filter member;
    brake means selectively operable to stop rotation of said drum after operation of said drive means is terminated;
    second control means operable to commence operation of said drive means, to terminate operation of said drive means in response to expiration of a predetermined time period after operation of said transfer means has been terminated commence operation of said brake means at approximately the same time as the operation of said drive means is terminated;
    spray means for spraying a pressurized fluid onto the outer surface of said filter member to dislodge solid particles collected on the inner surface of said filter member;
    third control means operable to commence operation of said spray means at a predetermined time relative to terminating operation of said drive means and to terminate operation of said spray means in response to expiration of a predetermined time period after commencement of the operation of said spray means; and
    means for removing dislodged solid particles from the bottom portion of said drum.

2. A filtration apparatus according to claim 1 wherein said spray means includes means for spraying a pressurized fluid onto the inner surface of said filter member.

3. A filtration apparatus according to claim 2 wherein said third control means includes means for commencing operation of said spray means at substantially the same time as operation of said drive means is terminated and for terminating operation of said spray means at a predetermined time after commencement of operation thereof.

4. A filtration apparatus according to claim 3 further including a generally cylindrical shell surrounding and spaced radially outwardly from said drum to define a chamber for collecting the liquid filtrate passing through said filter member;
    said shell having a discharge port through which the liquid filtrate is discharged from said chamber.

5. A filtration apparatus according to claim 4 wherein said spray means includes
    an intermediate reservoir for receiving liquid filtrate from said shell;
    spray manifold means including first nozzle means for directing a liquid spray onto the outer surface of said filter member and second nozzle means for directing a liquid spray onto the inner surface of said filter member; and
    pump means for withdrawing the liquid filtrate from the intermediate reservoir and supplying same to said spray manifold means.

6. A filtration apparatus according to claim 1 wherein said transfer means includes pump means for withdrawing said liquid from a storage reservoir; and
    said first control means includes means for commencing operation of said pump at a predetermined time.

7. A filtration apparatus according to claim 6 wherein said first control means further includes means for terminating operation of said pump mean at a predetermined time after commencement of operation thereof.

8. A filtration apparatus according to claim 1 wherein said bottom portion includes
    a bottom wall which tapers downwardly in a radial direction from said filter member toward said axis and includes at least one outlet opening through which dislodged solid particles are discharged from the interior of said drum; and
    a plurality of radially extending, circumferentially spaced ribs on the interior of said bottom wall for promoting the flow of liquid and solid particles upwardly and radially outwardly toward said filter member while said drum is rotating and thereby minimize the amount of liquid discharged through said outlet opening.

9. A filtration apparatus according to claim 1 wherein said top portion includes an annular inlet opening concentric with said axis;
    said bottom portion has a bottom wall including at least one outlet opening through which dislodged solids are discharged from the interior of said drum; and
    said drum includes a baffle plate mounted for common rotation with said drum, spaced above said a bottom wall and extending radially outwardly beyond said outlet opening so as to inhibit liquid entering through said inlet opening from flowing directly from said inlet opening to said outlet opening.

10. A filtration apparatus according to claim 1 wherein
said drive means includes an electrical motor having a drive shaft operably connected to said drum; and
said brake means is an electrically-operated device operable to stop rotation of said motor drive shaft.

11. A filtration apparatus for removing solid particles from a liquid and collecting a low moisture solid residue comprising
a drum supported for rotation about an axis and including an interior, a top portion and a bottom portion and a filter member defining at least part of a side wall extending between said top portion and said bottom portion and having an inner surface and an outer surface;
pump means for withdrawing a liquid containing solid particles from a storage reservoir and introducing said liquid into the interior of said drum;
first control means including means for commencing operation of said pump at predetermined time intervals and means for terminating operation of said pump means in response to expiration of a predetermined time period after commencement of the operation of said pump means;
drive means for rotating said drum about said axis at a sufficient speed to generate centrifugal forces for forcing said liquid radially outwardly toward said filter member and cause a flow of liquid filtrate through said filter member and a relatively dry layer of solid particles to collect on the inner surface of said filter member;
brake means selectively operable to stop rotation of said drum after operation of said drive means is terminated;
second control means operable to commence operation of said drive means, to terminate operation of said drive means in response to expiration of a predetermined time period after operation of said pump means has been terminated and to commence operation of said brake means at approximately the same time as the operation of said drive means is terminated;
spray means for spraying a pressurized liquid onto the outer and inner surfaces of said filter member to dislodge solid particles collected on the inner surface of said filter member;
third control means including means for commencing operation of said spray means is substantially the same time as operation of said drive means is terminated and for terminating operation of said spray means in response to expiration of a predetermined time period after commencement of the operation of said spray means;
a generally cylindrical shell surrounding and spaced radially outwardly from said drum to define a chamber for collecting the liquid filtrate passing through said filter member, said shell having a discharge port through which the liquid filtrate is discharged from said chamber; and
means for removing dislodged solid particles from the bottom portion of said drum.

12. A filtration apparatus according to claim 11 wherein said bottom portion includes
a bottom wall which tapers downwardly in a radial direction from said filter member toward said axis and includes at least one outlet opening through which dislodged solid particles are discharged from the interior of said drum; and
a plurality of radially extending, circumferentially spaced ribs on the interior of said bottom wall for promoting the flow of liquid and solid particles upwardly and radially outwardly toward said filter member while said drum is rotating and thereby minimize the amount of liquid discharged through said outlet opening.

13. A filtration apparatus according to claim 11 wherein
said top portion includes an annular inlet opening concentric with said axis;
said bottom portion has a bottom wall including at least one outlet opening through which dislodged solids are discharged from the interior of said drum; and
said drum includes a baffle plate mounted for common rotation with said drum, spaced above said a bottom wall and extending radially outwardly beyond said outlet opening so as to inhibit liquid entering through said inlet opening from flowing directly from said inlet opening to said outlet opening.

14. A filtration apparatus according to claim 11 wherein
said drive means includes an electrical motor having a drive shaft operably connected to said drum; and
said brake means is an electrically-operated device operable to stop rotation of said motor drive shaft.

15. A filtration apparatus according to claim 14 wherein said spray means includes
an intermediate reservoir for receiving liquid filtrate from said shell;
spray manifold means including first nozzle means for directing a liquid spray onto the outer surface of said filter number and second nozzle means for directing a liquid spray onto the inner surface of said filter member; and
pump means for withdrawing the liquid filtrate from the intermediate and supplying same to said spray manifold means.

* * * * *

UNITED STATES PATENT AND TRADEMARK OFFICE
CERTIFICATE OF CORRECTION

PATENT NO. : 5,182,008
DATED : January 26, 1993
INVENTOR(S) : Richard J. Shelstad It is certified that error appears in the above-identified patent and that said Letters Patent is hereby corrected as shown below:

Column 5, line 56, after "terminated", insert ---and to---.

Column 6, line 41, "mean" should read ---means---.

Column 7, line 51, delete "is" and insert ---at---.

Signed and Sealed this

Sixteenth Day of November, 1993

Attest:

BRUCE LEHMAN

Attesting Officer     Commissioner of Patents and Trademarks